United States Patent [19]

Kobayashi et al.

[11] Patent Number: 5,539,157
[45] Date of Patent: Jul. 23, 1996

[54] MULTI-CHECK METERING METHOD USING LOAD CELLS AND METERING DEVICE FOR THE SAME

[75] Inventors: Masashi Kobayashi; Hiroyuki Ohyama; Hideshi Tokubuchi; Kazuo Nakamura, all of Tosu, Japan

[73] Assignee: Hisamitsu Pharmaceutical Co., Inc., Tosu, Japan

[21] Appl. No.: 128,472

[22] Filed: Sep. 28, 1993

[51] Int. Cl.$^6$ ................................................ G01G 19/52
[52] U.S. Cl. .................... 177/50; 177/25.13; 177/45
[58] Field of Search ................................ 177/25.13, 45, 177/50, 199, 200

[56] References Cited

U.S. PATENT DOCUMENTS 4,582,454  4/1986  Brandenburg et al. ............... 177/50 X
4,693,330  9/1987  Uchimura et al. .................. 177/25.13
5,440,076  8/1995  van Roostselaar ..................... 177/50

OTHER PUBLICATIONS

"Method and Apparatus for Double Checking by Means of Load Cell" Patent Abstracts of Japan, May 18, 1993.

*Primary Examiner*—Brian W. Brown
*Assistant Examiner*—Randy W. Gibson
*Attorney, Agent, or Firm*—Bucknam and Archer

[57] ABSTRACT

A multi-check metering method employing load cells, characterized in that a plurality of load cells preferably stacked one upon another are attached to a metering table, a material to be metered is placed on said metering table, said load cells are operated simultaneously by applying thereto the weight of said material, and respective metered weights of said material are displayed by metered-weight display means based on output signals sent from said load cells; and a load cell metering device comprising a metering table, a plurality of load cells and metered-weight display means.

12 Claims, 7 Drawing Sheets

MULTI-CHECK METERING METHOD USING LOAD CELLS AND METERING DEVICE FOR THE SAME

BACKGROUND OF THE INVENTION

1. Field of the Invention

The present invention relates to a multi-check metering method for metering the weight of a raw material by using a plurality of load cells, which are preferably provided one upon another, to enable every metering operation to be performed with multiple check kept thereon, thereby achieving secure metering, and it also relates to a metering device for carrying out said method.

2. Prior Art

Conventionally, in a process of manufacturing pharmaceutical preparations, a plurality of drugs as raw materials are mixed together. When the respective drugs are to be weighed, they are weighed twice by a metering unit. For example, a primary metering unit is provided midway along the convey line of the raw material. The raw material fed From the convey line is placed on the primary metering unit to measure its weight. When the raw material so weighed is to be loaded into a mixing tank and mixed therein, the weight of this raw material is measured again by a secondary metering unit with which the mixing tank is provided.

In this manner, the multiple check on the weight of the raw material used is performed by the primary and secondary metering units to prevent an abnormality of the metering units, an erroneous amount of the raw material loaded, or the like.

However, the above metering method raises the Following problems.

More specifically, according to the above metering method, at least two metering units in total are required for the raw material convey line and the mixing tank. In this case, since other units have been mounted on the manufacturing line of the pharmaceutical preparations, spaces for installing the metering units on this line cannot easily be obtained, thus making it difficult to install the metering units on said line.

When two metering units are installed, the number of times of the operation for checking the weight of the raw material is increased in the manufacturing process of the pharmaceutical preparations whereby operations in the manufacturing process are made cumbersome.

Furthermore, when an abnormality occurs in either metering unit, the disorder will be recognized or appreciated at the time of metering the raw material by the secondary metering unit which is the final one in this case. Therefore, undesirable preparations may be made in the mixing tank.

SUMMARY OF THE INVENTION

It is an object of the present invention to provide a multi-check metering method using load cells which is able to solve the above problems.

It is another object of the present invention to provide a metering device for carrying out the method.

According to the present invention, there is provided a multi-check metering method employing load cells, characterized in that a plurality of load cells are attached to a metering table, the material to be metered is placed on the metering table, the load cells are operated simultaneously by applying to them the weight of the to-be-metered material and respective metered weights of the material are displayed by metered-weight display means based on output signals from the load cells.

In the above method, the plurality of load cells may be stacked one upon another on the metering table.

According to the present invention, there is also provided a load cell metering device comprising a metering table for placing a the to-be-metered material thereon, a plurality of load cells mounted on the metering table, and metered-weight display means for displaying respective weights of the to-be-metered material based on output signals from the load cells.

In the load cell metering device, the plurality of load cells may be stacked one upon another on the metering table.

According to the present invention, in the manufacturing process of, e.g., pharmaceutical preparations, a to-be-metered raw material supplied from a convey line is placed on the metering table, and the weight of the raw material is metered. At this time, the respective load cells are operated by applying to them the weight of the raw material supplied from the metering table, output signals from the load cells are sent to the metered-weight display means, and the respective weights of the raw material are displayed by the metered-weight display means based on the output signals from the load cells, so as to confirm the weight.

In this manner, the load cells are operated simultaneously so that the resulting respective metered weights are displayed simultaneously, whereby multiple check is effected on the weight of the raw material, thus facilitating confirmation of the metered weight.

Furthermore, in the manufacturing process of the pharmaceutical preparations, the weight of the raw material is metered before loading the raw material into the mixing tank, thereby eliminating the production of undesirable preparations in the mixing tank.

DETAILED DESCRIPTION OF THE PREFERRED EMBODIMENTS

The preferred embodiments of the present invention will be described with reference to the accompanying drawings.

Note that in the following embodiments, a load cell metering device having two weighing load cells will be mainly described, but the present invention is not limited to these embodiments and the load cell metering device may have three or more weighing load cells.

Figure 1:
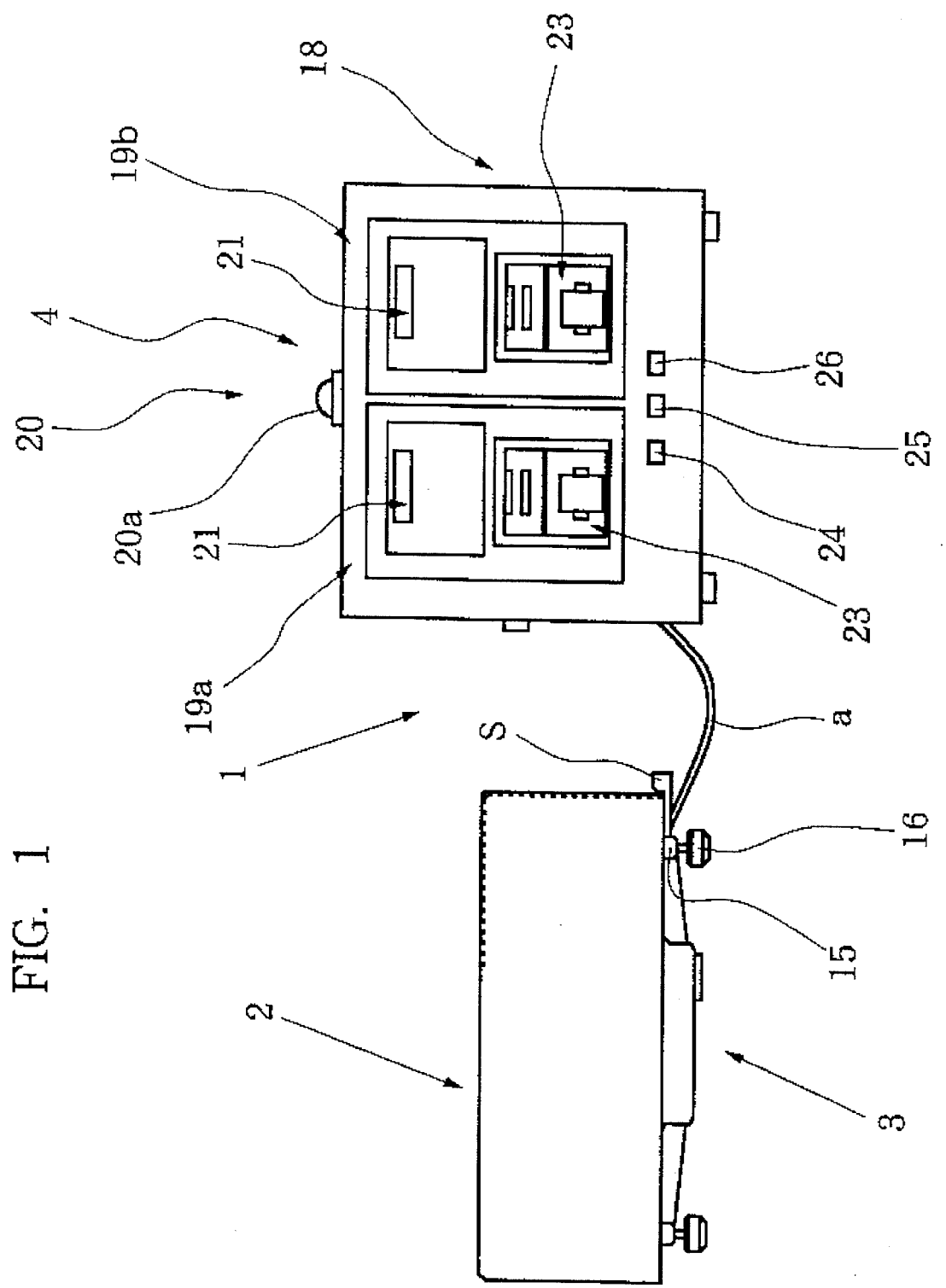
FIG. 1 is an overall side view of a load cell metering device according to an embodiment of the present invention.

Referring to FIG. 1, reference numeral 1 denotes a load cell metering device provided on a manufacturing line of pharmaceutical preparations or the like. A plurality of weighing load cells 3 are housed in a metering table 2. A raw material to be metered is placed on the metering table 2. The respective load cell 3 are operated simultaneously by applying to them the weight of the raw material. A metered-weight display means 4 displays the metered weights based on output signals from the respective weighing load cells 3, thereby securely metering the raw material.

The load cell metering device 1 comprises the metering table 2 for placing thereon the to-be-metered raw material for the pharmaceutical preparations, the plurality of weighing load cells 3 housed in the metering table 2, and the metered-weight display means 4 for displaying the weights of the raw material based on the output signals from the weighing load cells 3. The constitution of the load cell metering device 1 will be described with reference to FIGS. 2 and 3.

Figure 2:
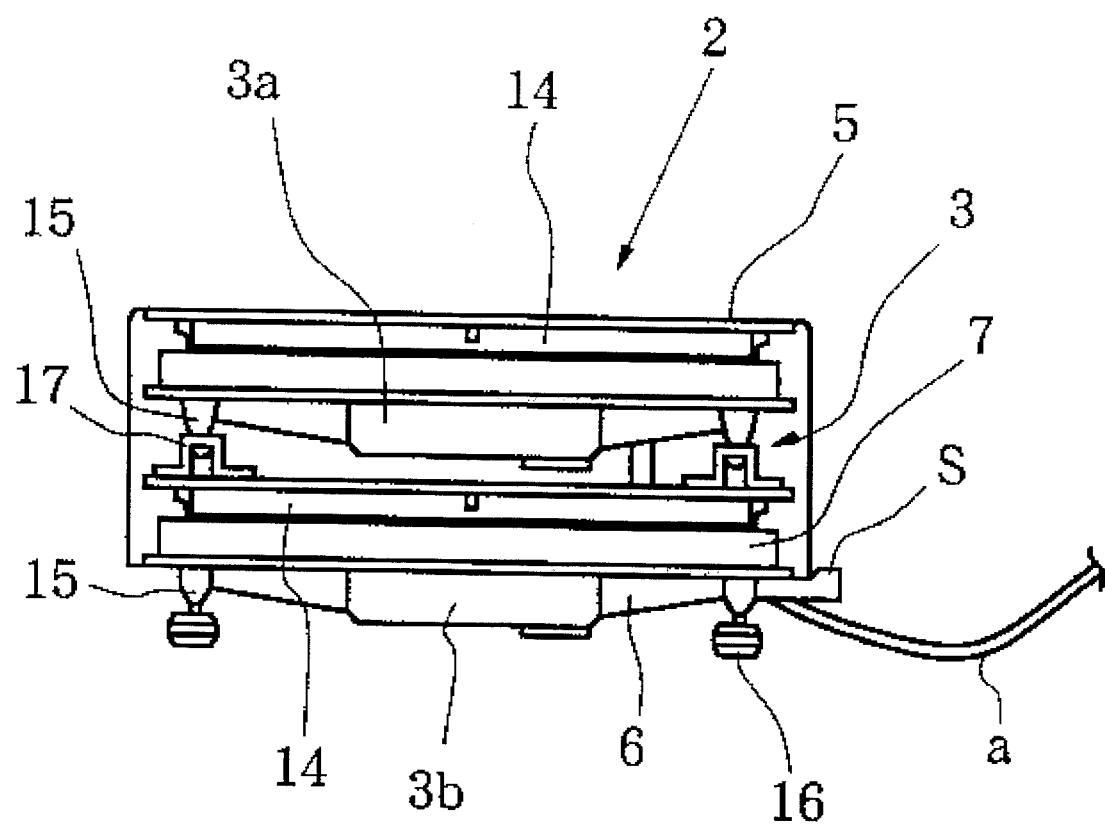
FIG. 2 is a sectional view of a metering table according to an embodiment of the present invention.

More specifically, as shown in FIG. 2, in the metering table 2, the ceiling portion of a box-like metering unit cover 5 for placing the raw material thereon is mounted on the upper side surface of a combination of two weighing load cells 3 which are stacked one upon another, thereby covering the respective weighing load cells 3 with the cover 5.

In each load cell 3, a beam 8 made of a metal plate and extending in the right and left direction is mounted between a lower case 6 that enables the cell to be placed stably and an upper case 7 that can be moved upward and downward with respect to the lower case 6, at predetermined gaps between the beam and the lower and upper cases 6 and 7. The central portion and the upper and lower side portions of the beam 8 are cut off to form thin portions 8a which become more flexible. When the raw material is placed on the upper case 7, the upper case 7 is moved downward. Then, the weight of the raw material on the upper case 7 acts on the beam 8 to distort the thin portions 8a of the beam 8.

Figure 3:
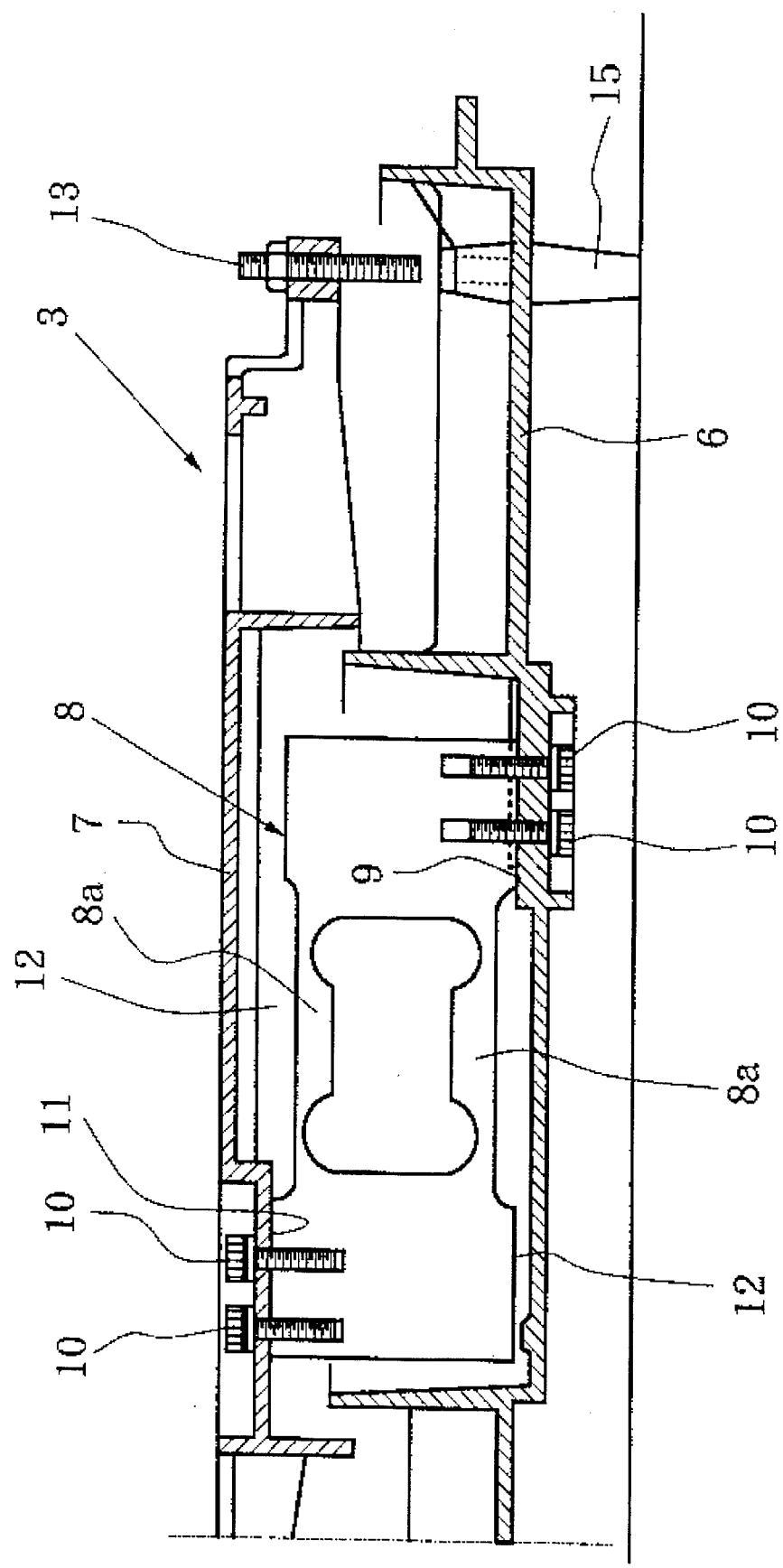
FIG. 3 is an enlarged sectional view of a load cell weighing.

In this embodiment, as shown In FIG. 3, a beam table 9 is provided on the bottom surface portion of the lower case 6, and one end portion of the beam 8 is connected to the beam table 9 through bolts 10. At the same time, a beam mounting portion 11 is formed to project from the ceiling portion of the upper case 7, and the other end portion of the beam 8 is connected to the beam mounting portion 11 through the bolts 10. In each weighing load cell weigher 3, upper and lower operational spaces 12 of the beam 8 are defined between the beam 8 and each of the upper and lower cases 6 and 7 by the beam table 9 and the beam mounting portion 11. Reference numeral 13 denotes a guide pin mounted on the upper case 7.

Furthermore, a mounting table 14 is attached to the upper side surface of the upper case 7 of each cell. The weighing load cells 3 are stacked one upon another through the mounting tables 14, and a leg portion 15 is mounted on an upper load cell 3a. The metering unit cover 5 is mounted on the upper load cell weigher 3 through the corresponding mounting table 14. Reference numeral 16 denotes a horizon adjusting member provided on the leg portion 15 of a lower weighing load cell 3b; and 17, a fixing member for fixing the leg portion 15 of the upper weighing load cell weigher 3a to the lower mounting table 14. Reference symbol S denotes a horizontal member for placing the metering table 2 horizontally.

In this embodiment, a strain gauge connected to the metered-weight display means 4 is mounted to the deformed portion of each beam 8. An output signal caused by deformation of each beam 8 is sent from the strain gauge to the metered-weight display means 4. The metered-weight display means 4 displays each metered weight based on the output signal from the corresponding strain gauge.

Figure 4:
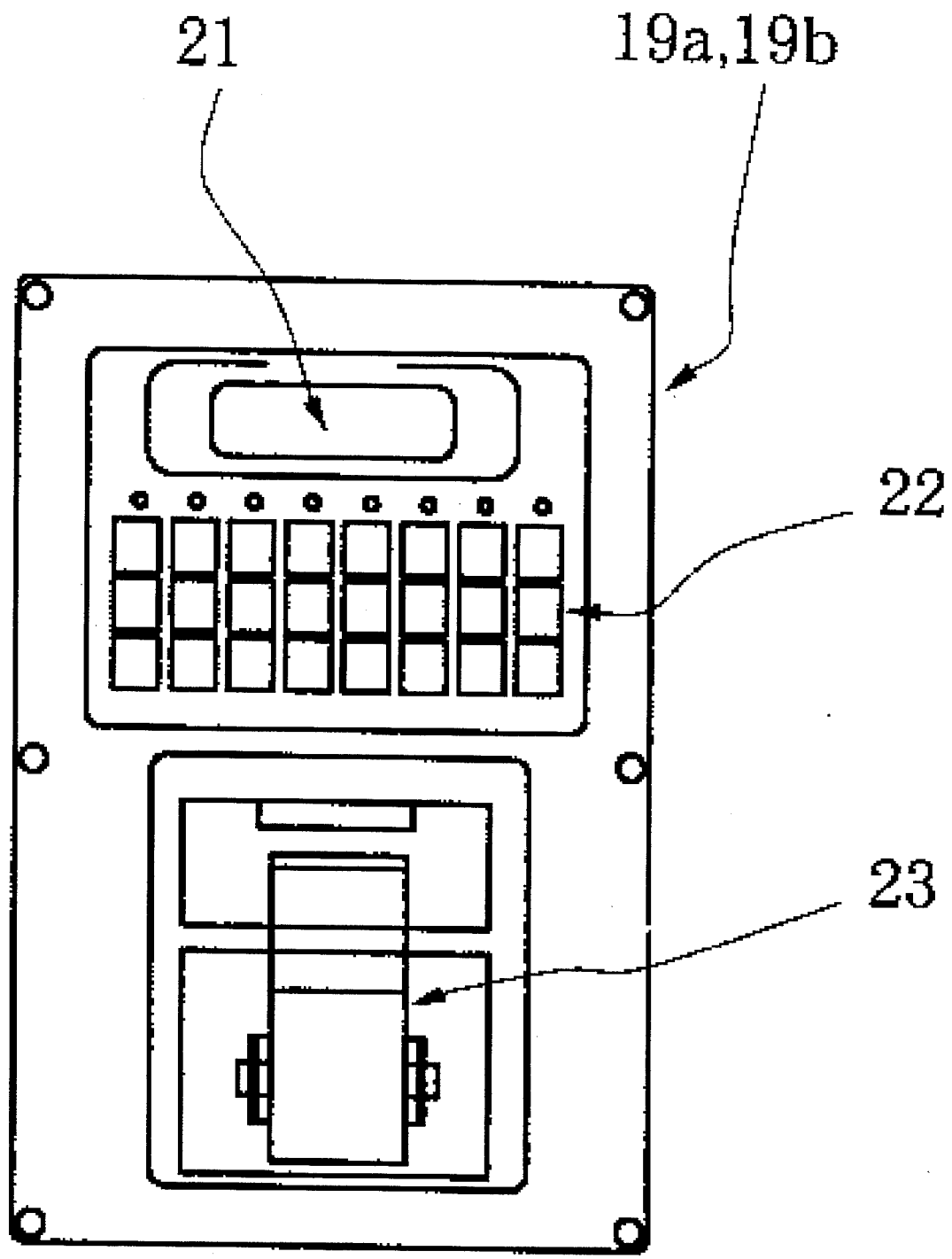
FIG. 4 is a diagram showing the display section of a metered-weight display unit.
Figure 5:
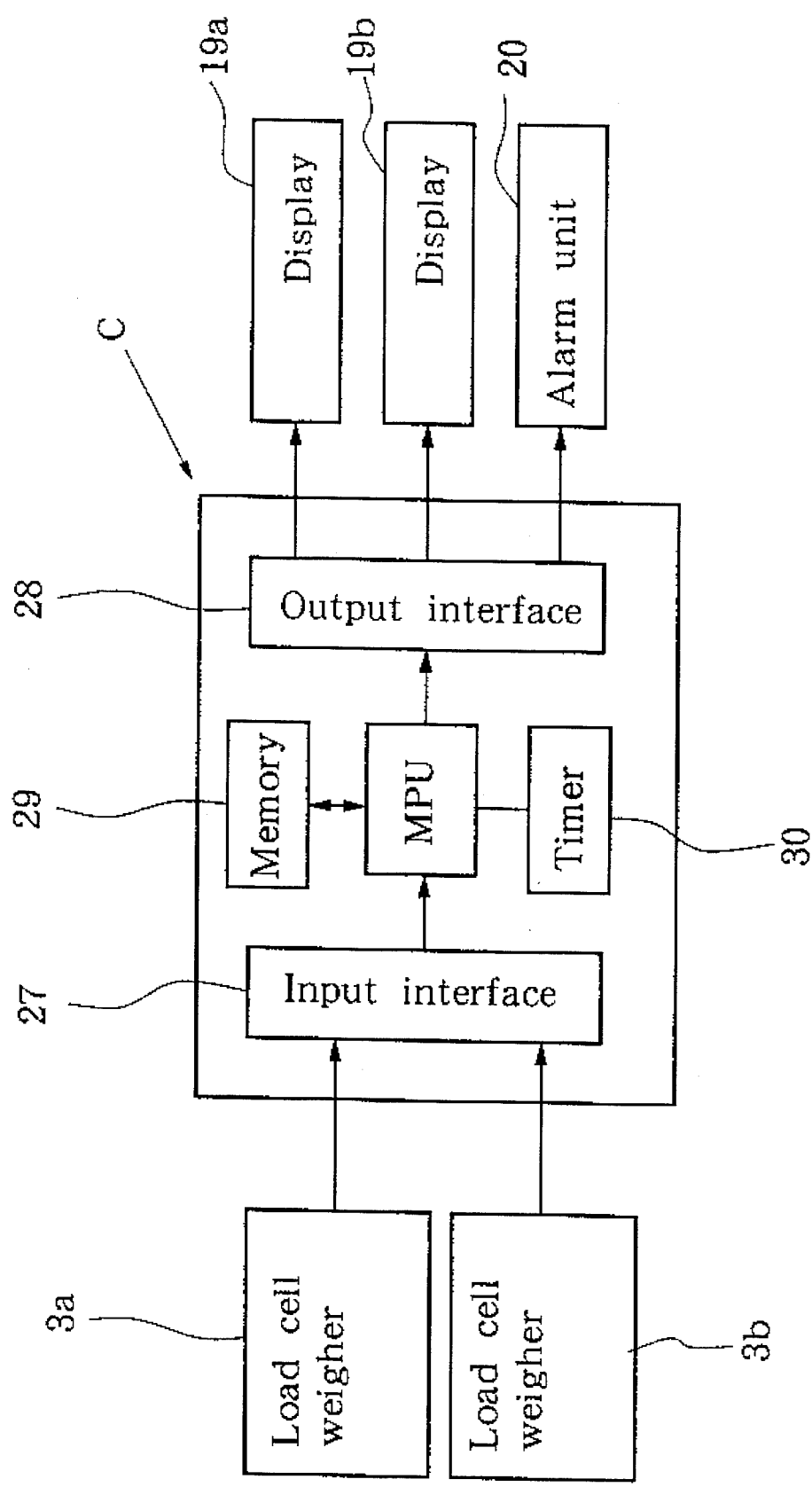
FIG. 5 is a control block diagram of the load cell metering device.

Now, the metered-weight display means 4 for displaying the respective weights of the raw material based on the output values from the respective weighing load cells 3 will be described. More specifically, the metering table 2 is connected to a metered-weight display unit 18 as the metered-weight display means 4. As shown in FIGS. 1, 4 and 5, the metered-weight display unit 18 comprises a controller C for determining or judging the output signals from the weighing load cells 3, and a plurality of displays 19a and 19b for displaying the output signals outputted from the controller C. Reference symbol "a" denotes a cord for transmitting the output signals of the weighing load cell 3 from the metering table 2 to the metered-weight display unit 18.

In this embodiment, the displays 19a and 19b are connected to the upper and lower weighing load cells 3a and 3b, respectively, and the weights received by the cells 3a and 3b are displayed respectively by the displays 19a and 19b. The metered-weight display unit 18 is provided with an alarm unit 20, e.g., a lamp 20a, for alarming a weight abnormality of the load cells 3a and 3b. When an abnormality of metering occurs in the weighing load cells 3a or 3b, the lamp 20a is flickered, and at the same time a buzzer is operated.

Each of the displays 19a and 19b is provided with a digital metered-weight display section 21 at its upper portion, an operation button portion 22 including various types of operation buttons at its central portion, and a printer section 23 at its lower portion. The weights of the to-be-metered material placed on the metering table 2 are digitally displayed at the metered-weight display section 21, and the weights are printed at the printer section 23.

In this embodiment, the displays 19a and 19b of the metered-weight display unit 18 are set respectively for the load cells 3a and 3b. In the upper load cell weigher 3a, the display 19a is set to indicate a weight obtained by subtracting the weight of the metering unit cover 5 positioned above cell 3a. In the lower weighing load cell 3b, the display 19b is set to indicate a weight which is obtained by subtracting the weights of the weighing load cell 3a and the metering unit cover 5.

With this constitution or arrangement, when the raw material is placed on the metering table 2, the load cells 3a and 3b are operated to transmit the output signals therefrom to the metered-weight display unit 18, and the displays 19a and 19b display the metered weights simultaneously based on the output signals.

In addition, when the weight of the raw material is correctly metered by the load cell 3a and 3b, the displays 19a and 19b are operated based on the output signals from the weighing load cells 3a and 3b, and the respective weights are printed. Thereafter, the controller C makes a determination or judgement of the respective output signals. If the weights are correct weights, the alarm unit 20 is not operated. Reference numeral 24 denotes a power button of the load cell metering device 1 provided on the metered-weight display unit 18; 25, a start button; and 26, a stop button.

The constitution or arrangement of the controller C incorporated in the metered-weight display unit 18 will be described below. Referring to FIG. 5, the controller C has a microprocessor unit MPU, input and output interfaces 27 and 28, a memory 29 comprising a ROM and a RAM, and a timer 30. The output signals from the respective load cell weighers 3a and 3b are transmitted to the input interface 27.

The output interface 28 is connected to the displays 19a and 19b and the alarm unit 20, and transmits operation signals to the displays 19a and 19b and the alarm unit 20. The memory 29 stores a program for operating the displays 19a and 19b and the alarm unit 20 based on the output signals from the load cell weighers 3a and 3b.

The load cell metering device 1 is controlled by the controller C in this manner so that the load cells 3a and 3b perform a reliable metering operation.

Now, the operating method of the load cell metering device 1 will be hereunder described in detail. In this embodiment, the upper weighing load cell 3a housed in the metering table 2 is used for metering an amount of the raw material loaded, and the lower weighing load cell 3b is used for metering for the purpose of a cheek.

First, the power button 24 is turned on. Before the load cell metering device 1 is used, the corresponding operation button section 22 is operated to set a predetermined weight value for the desired amount loaded and metered in the display 19a of the metered-weight display unit 18 that displays the weight metered by the upper load cell weigher 3a. In this case, the predetermined value can also be used as a reference value or a criterion for determining or judging whether the amount loaded is insufficient or excessive.

Furthermore, a weight value caused by the incessant drop or falling of raw material onto the metering table at the Lime of loading and metering is subtracted in advance from the predetermined value in order to prevent excessive loading. Then, insufficient and excessive weight values are set in order to set insufficient and excessive loading determination ranges. The condition for determining the insufficient loading is set to be such that the metered weight value reaches a weight value<(preset predetermined weight value)−(preset; insufficient weight value), and the condition for determining the excessive weight is set to be such that the metered weight value reaches a weight value>(preset predetermined weight value)+(preset excessive weight value).

Regarding the display 19b of the metered-weight display unit 18 that displays the value of the lower load cell weigher 3b, the corresponding operation button section 22 is operated to set the predetermined weight value and the insufficient or excessive weight values in the display 19b.

Both the displays 19a and 19b determine a correct weight value when the obtained weight value is other than the insufficient or excessive weight value. In this case, the determining condition is set to be such that the metered weight value reaches a weight value ≧(preset predetermined weight value)−(preset insufficient weight value) and a weight value≦(preset predetermined weight value)+(preset excessive weight value).

Furthermore, in this embodiment, a container is placed on the metering table 2, and the raw material is charged in the container; when metering the raw material, the start button 25 is depressed, the displays 19a and 19b are set to display, as zero weight value, a weight value which is obtained by automatically subtracting the weight of the empty container (tare); a large-amount loading signal and a small-amount loading signal stored in each of the displays 19a and 19b are on; when the raw material is placed on the metering table 2 to meter it, if the weight value is increased to a weight value≧(preset predetermined weight value)−(a preset weight value for turning off the large-amount loading signal), the large-amount loading signal is off to stop charging of a large amount of the raw material; and when a weight value≧(preset predetermined value)−(preset weight value caused by the drop of the raw material) is reached, the small-amount loading signal is off to stop charging of a small amount of the raw material, thereby completing metering the raw material.

When the metering operation is completed, the printer sections 23 of the displays 19a and 19b are operated to print the metered weight values; thereafter, the metered weight values sent from the weighing load cells 3a and 3b are judged or determined; if both the weighing cells 3a and 3b are judged or determined to have metered correctly, the abnormality alarm is not actuated. If the judgements or determinations of the weighers 3a and 3b are different, the abnormality alarm is actuated.

Figure 6:
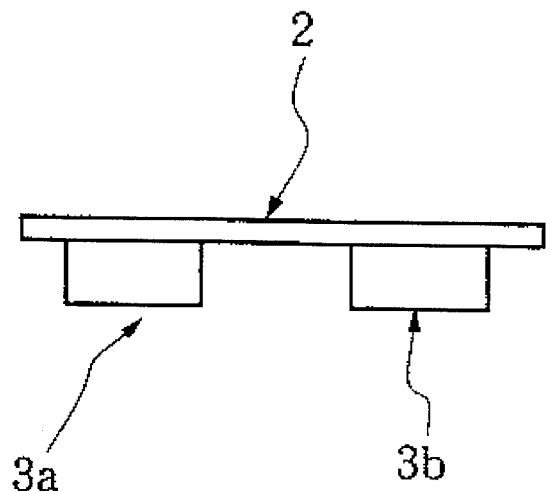
FIG. 6 is a diagram showing a metering table according to another embodiment of the present invention.
Figure 7:
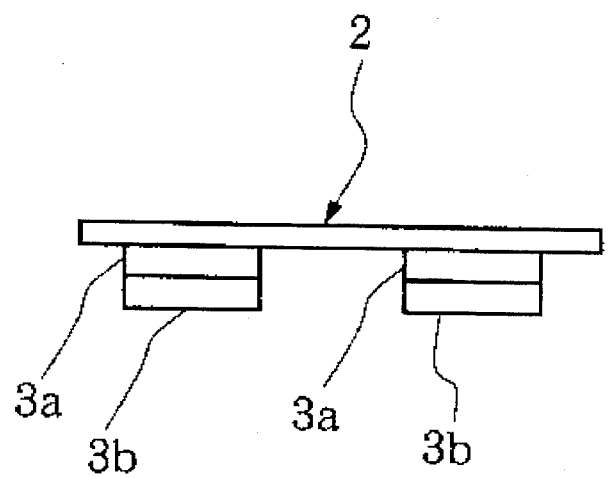
FIG. 7 is a diagram showing a metering table according to a still other embodiment of the present invention.
Figure 8:
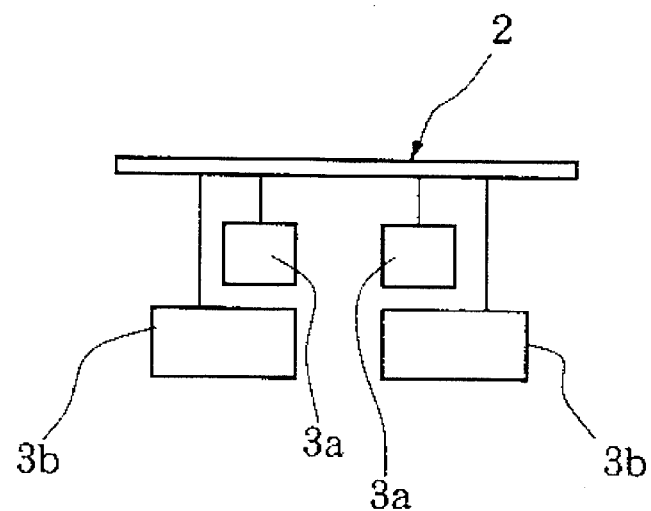
FIG. 8 is a diagram showing a metering table according to a further embodiment of the present invention.

In this embodiment, there has been detailed the metering table 2 having two weighing load cells 3 which are stacked one upon another. FIGS. 6 to 9 show other embodiments of the present invention. FIG. 6 shows a structure in which two weighing load cells 3a and 3b are attached in parallel to the left and right sides of a metering table 2, respectively. FIG. 7 shows a structure in which two sets of two load cells 3a and 3b stacked one upon another are attached in parallel to the left and right sides of a metering table 2, respectively. FIG. 8 shows a structure in which two weighing load cells 3b are attached in parallel to a metering table 2 so that they movably support the metering table 2, and two load cell 3a are movably attached to the metering table 2 in a floating state. When metering is performed, the upper weighing load cells 3a are let to move downward by the weight of a to-be-metered material and fixed on the lower load cell weighers 3b. The load cells of the load cells 3a and 3b are operated to perform metering.

Figure 9:
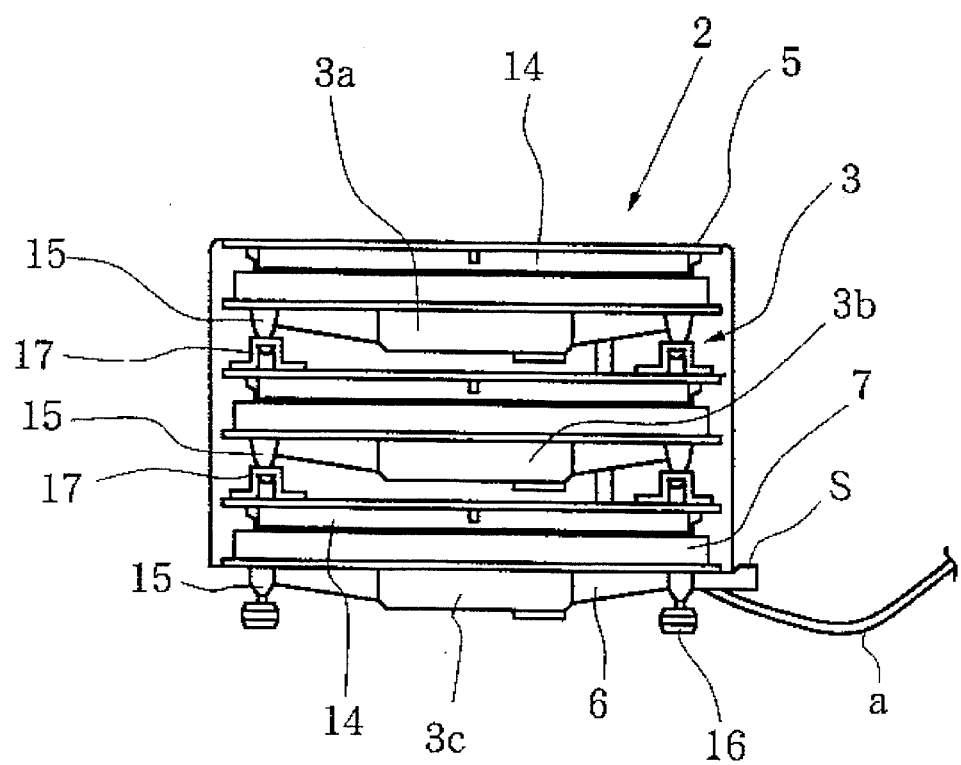
FIG. 9 is a sectional view of a metering table according to a still further embodiment of the present invention.

Further, FIG. 9 shows a structure in which three load cells 3a, 3b and 3c stacked one upon another are attached to a metering table 2. When this structure is used, triple check can be performed every metering operation.

Furthermore, this embodiment employs strain gauge type load cells, but static capacitance, tuning fork oscillation, inductance, or differential transformer type load cells can also be utilized in such embodiments. The types of loads to be applied to these load cells are a tensile load, a compression load, a bending load, a shearing load, and the like. The present invention includes all types of these loads.

[Effects of the Invention]

As has been described above, according to the present invention, a plurality of load cells are operated simultaneously and the metered values obtained from the respective cells are displayed simultaneously, so that the raw material is metered with multiple check kept thereon to ensure secure metering easily, thereby smoothly performing the operation in the manufacturing process.

Furthermore, in the process of manufacturing pharmaceutical preparations, multiple check is effected on metering of the raw material before loading the raw material in the mixing tank, so as to eliminate the production of undesirable preparations in the tank and improve the efficiency off the metering operation.

What is claimed is:

1. A load cell metering device comprising a metering table for placing thereon a material to be metered, at least two load cells directly or indirectly attached to said metering table, said load cells respectively emitting output signals, and at least two metered-weight display means for simultaneously displaying respective weights of said material respectively based on said output signals from said load cells.

2. The device according to claim 1 wherein each load cell has a beam, the device is provided with a lower case for resting the load cell and an upper case movable upwardly and downwardly with respect to said lower case, said beam being mounted between said upper case and said lower case.

3. The device according to claim 1, wherein two load cells are stacked one upon the other, said table being mounted on one of said load cells, said load cell being mounted on the other load cell.

4. The device according to claim 1 wherein said display means comprises a controller for determining said weights based on said output signals from said load cells, at least two displays for displaying said output signals outputted from said controller, and said controller has a memory.

5. The device according to claim 1 which is provided with an alarm unit for alarming an abnormality in the weight of said material.

6. The device according to claim 1 wherein said table has a right side and a left side, two load cells are attached in parallel to said right side and said left side respectively of said metering table.

7. The device according to claim 6 wherein two sets of two load cells are stacked one upon the other and said two sets are attached in parallel to said left and said right side respectively of said metering table.

8. The device according to claim 1 wherein two first load cells are attached in parallel to said metering table and said two first load cells movably support said metering table, two second load cells are movably attached to said metering table in a floating state, said two second load cells are placed above said two first load cells whereby when metering is performed, said second load cells move downwardly and are fixed on said first lower load cells.

9. The device according to claim 1 wherein three load cells are stacked one upon another.

10. A multi-check metering method for metering a material wherein at least two load cells are attached to a metering table which comprises placing the material to be metered on said metering table, operating said cells simultaneously by applying thereto the weight of said material, said load cells outputting signals, and simultaneously displaying the metered weights of said material by metered-weight display units based on said output signals from said load cells, said display units comprising at least two displays each of which display one of said output signals, respectively, and the metered weights are based on said output signals simultaneously displayed.

11. The method according to claim 10, wherein said load cells are stacked one upon the other.

12. The method according to claim 10 wherein a sound and a light alarm an abnormality in the metering of said material.

* * * * *